United States Patent
Park et al.

(10) Patent No.: US 10,853,026 B2
(45) Date of Patent: Dec. 1, 2020

(54) METHOD AND APPARATUS FOR STREAMING AUDIO BY USING WIRELESS LINK

(71) Applicant: Samsung Electronics Co., Ltd., Gyeonggi-do (KR)

(72) Inventors: Jin Soo Park, Gyeonggi-do (KR); Jong Hwa Kim, Gyeonggi-do (KR); Hyun Wook Kim, Gyeonggi-do (KR); Han Gil Moon, Daejeon (KR); Sang Hoon Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/465,383

(22) PCT Filed: Nov. 30, 2017

(86) PCT No.: PCT/KR2017/013962
§ 371 (c)(1),
(2) Date: May 30, 2019

(87) PCT Pub. No.: WO2018/101777
PCT Pub. Date: Jun. 7, 2018

(65) Prior Publication Data
US 2020/0004496 A1    Jan. 2, 2020

(30) Foreign Application Priority Data
Nov. 30, 2016 (KR) .......................... 10-2016-0162273

(51) Int. Cl.
*G06F 3/16* (2006.01)
*G06F 3/041* (2006.01)
(Continued)

(52) U.S. Cl.
CPC ............ *G06F 3/165* (2013.01); *G06F 3/0416* (2013.01); *H04L 29/06* (2013.01); *H04L 65/601* (2013.01); *H04L 65/607* (2013.01); *H04W 28/10* (2013.01)

(58) Field of Classification Search
CPC ....... G06F 3/165; G06F 3/0416; H04L 29/06; H04L 65/601; H04W 28/10
See application file for complete search history.

(56) References Cited

U.S. PATENT DOCUMENTS 7,765,324 B2    7/2010    Imiya
8,737,803 B2    5/2014    Pereira
(Continued)

FOREIGN PATENT DOCUMENTS

JP           3988682       10/2007
KR        1020080079088    8/2008

OTHER PUBLICATIONS

PCT/ISA/210 Search Report issued on PCT/KR2017/013962, pp. 7.
PCT/ISA/237 Written Opinion issued on PCT/KR2017/011857, pp. 7.

*Primary Examiner* — Ajay Cattungal
(74) *Attorney, Agent, or Firm* — The Farrell Law Firm, P.C.

(57) ABSTRACT

An electronic device may include a processor, a communication module to establish a wireless link with an output device, and a transmit buffer in which an audio packet to be transmitted to the output device through the wireless link is stored. The processor may be configured to control the communication module to transmit an audio packet, which is encoded at a first bit rate, stored in the transmit buffer to the output device, to store, in the transmit buffer, an audio packet, which is encoded at a second bit rate lower than the first bit rate, when a state of the transmit buffer fails to satisfy a threshold condition, and to control the communi- (Continued)

cation module to transmit the audio packet encoded at the second bit rate to the output device.

15 Claims, 12 Drawing Sheets

(51) Int. Cl.
*H04L 29/06* (2006.01)
*H04W 28/10* (2009.01)

(56) References Cited

U.S. PATENT DOCUMENTS

| | | | |
|---|---|---|---|
| 8,873,560 B2 | 10/2014 | Frusina et al. | |
| 8,874,634 B2 | 10/2014 | Ramamurthy et al. | |
| 8,942,215 B2 | 1/2015 | Mallet et al. | |
| 8,984,576 B2 | 3/2015 | Sze et al. | |
| 9,042,444 B2 | 5/2015 | Frusina et al. | |
| 9,420,023 B2 | 8/2016 | Ramamurthy et al. | |
| 9,585,062 B2 | 2/2017 | Kaye et al. | |
| 9,756,468 B2 | 9/2017 | Frusina et al. | |
| 2002/0155808 A1 | 10/2002 | Kawamura | |
| 2005/0033857 A1* | 2/2005 | Imiya | H04L 29/06 709/232 |
| 2008/0208376 A1 | 8/2008 | Jung | |
| 2011/0007693 A1 | 1/2011 | Frusina et al. | |
| 2011/0280127 A1* | 11/2011 | Raaf | H04L 45/125 370/230 |
| 2012/0039391 A1 | 2/2012 | Frusina et al. | |
| 2012/0244811 A1* | 9/2012 | Chen | H04L 12/1827 455/41.2 |
| 2012/0250762 A1 | 10/2012 | Kaye et al. | |
| 2012/0260296 A1 | 10/2012 | Mallet et al. | |
| 2012/0301100 A1 | 11/2012 | Pereira | |
| 2012/0303797 A1 | 11/2012 | Mathur et al. | |
| 2012/0304232 A1 | 11/2012 | Mathur et al. | |
| 2012/0304240 A1 | 11/2012 | Pereira et al. | |
| 2013/0053048 A1* | 2/2013 | Garcia | H04L 12/5692 455/450 |
| 2013/0148640 A1* | 6/2013 | Li | H04L 1/1854 370/338 |
| 2013/0232228 A1 | 9/2013 | Ramamurthy et al. | |
| 2013/0273876 A1* | 10/2013 | Rasanen | H04M 3/42153 455/404.1 |
| 2014/0250486 A1 | 9/2014 | Sze et al. | |
| 2014/0337473 A1 | 11/2014 | Frusina et al. | |
| 2015/0046571 A1 | 2/2015 | Ramamurthy et al. | |
| 2015/0156659 A1 | 6/2015 | Sze et al. | |
| 2015/0215738 A1 | 7/2015 | Frusina et al. | |
| 2015/0271838 A1* | 9/2015 | Szilagyi | H04W 72/1263 370/336 |
| 2015/0327001 A1* | 11/2015 | Kirshenberg | H04W 76/11 455/41.2 |
| 2015/0341646 A1 | 11/2015 | Sze et al. | |
| 2016/0066172 A1* | 3/2016 | Pandolfi | H04W 4/24 455/406 |
| 2016/0359938 A1 | 12/2016 | Ramamurthy et al. | |
| 2018/0097680 A1* | 4/2018 | Di Taranto | H04W 72/08 |

\* cited by examiner

METHOD AND APPARATUS FOR STREAMING AUDIO BY USING WIRELESS LINK

PRIORITY

This application is a National Phase Entry of PCT International Application No. PCT/KR2017/013962 which was filed on Nov. 30, 2017, and claims priority to Korean Patent Application No. 10-2016-0162273, which was filed on Nov. 30, 2016, the content of each of which is incorporated herein by reference.

TECHNICAL FIELD

Embodiments disclosed in the disclosure relate to an audio streaming technology under a wireless network environment.

BACKGROUND ART

An audio streaming technology between heterogeneous devices using a wireless network link prevails. For example, a user terminal, such as a smartphone, is connected with an output device, such as a wireless headphone/speaker, through a Bluetooth wireless link, and music stored in the user terminal may be output through the wireless headphone or speaker using the wireless link.

DISCLOSURE

Technical Problem

The reproduction of the audio streaming using such a wireless link may be temporarily stopped in the middle of the audio reproduction. For example, the reproduction may be stopped, as the signal strength of the wireless link becomes weaker, or the output device becomes out of the coverage of the wireless link when the distance between the user terminal and the output device becomes more increased. In addition, the reproduction may be stopped due to the increase in the congestion of the frequency band (channel) used for the wireless link, or due to the influence of the interference with another signal.

For example, audio streaming which starts being reproduced at the bit rate of 328 kbps maintains the existing audio bit rate (328 kbps) without change during the transmission, even though the packet loss and the re-transmission rate are increased due to the change in distance between devices, the change in signal strength, or the change in the surrounding interference signal. When the packet loss and the increase in the re-transmission rate continue, the buffer underflow of the output device or the buffer overflow of the user terminal occurs. Accordingly, the reproduction interruption, which is not intended by the user, occurs and obstructs user experience.

The disclosure is to suggest an audio streaming method and an audio streaming device, which predict and actively cope with reproduction interruption, so as to solve the above problem.

Technical Solution

According to an embodiment disclosed in the disclosure, an electronic device may include a processor, a communication module to establish a wireless link with an output device, and a transmit buffer in which an audio packet to be transmitted to the output device through the wireless link is stored. The processor may be configured to control the communication module to transmit an audio packet, which is encoded at a first bit rate, stored in the transmit buffer to the output device, to store, in the transmit buffer, an audio packet, which is encoded at a second bit rate lower than the first bit rate, when a state of the transmit buffer fails to satisfy a threshold condition, and to control the communication module to transmit the audio packet encoded at the second bit rate to the output device.

According to an embodiment disclosed in the disclosure, a non-transitory recording medium to store computer-readable instructions may include instructions configured to, when executed by a processor of an electronic device, cause the processor to perform transmitting an audio packet encoded at a first bit rate to an output device wirelessly linked to the electronic device, storing, in the transmit buffer, an audio packet, which is encoded at a second bit rate lower than the first bit rate, when a state of the transmit buffer fails to satisfy a threshold condition, and transmitting the audio packet, which is encoded at the second bit rate, to the output device.

Advantageous Effects

According to embodiments disclosed in the disclosure, the increase in the distance between devices and the increase in the interference signal may be actively coped with under various environments of performing audio streaming through the wireless link, thereby minimizing sound interruption and improving the user experience.

Besides, a variety of effects directly or indirectly understood through the disclosure may be provided

MODE FOR INVENTION

Figure 1:
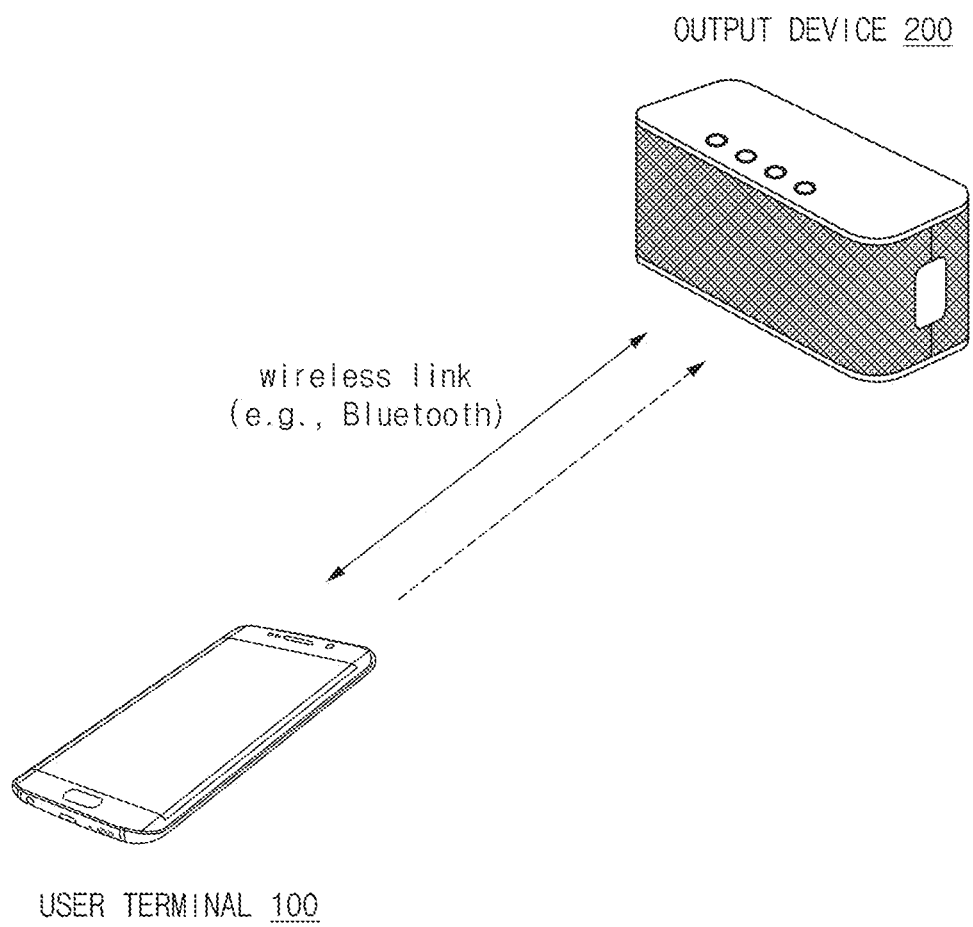
FIG. 1 illustrates an audio streaming environment using a wireless link, according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an audio streaming environment using a wireless link according to an embodiment.

Referring to FIG. 1, a user terminal 100 and an output device 200 may be connected with each other using a wireless link. In the disclosure, the user terminal 100 may refer to an electronic device which is able to transmit an audio file or data to the output device 200 in a streaming scheme. In another drawing, the user terminal 100 may be referred to as an electronic device 100.

The output device 200 may be connected with the user terminal 100 through the wireless link, similarly to a headset, a headphone, and a speaker that support the wireless link, and may correspond to all types of devices which are able to output audio data received from the user terminal 100. For example, although the output device 200, which is to generally reproduce and output an audio signal, refers to a device heterogeneous with the user terminal 100, the output device 200 may be a device homogenous with the user terminal 100 in some embodiments.

The user terminal 100 and the output device 200 may correspond to, for example, the relationship between a smartphone and a Bluetooth speaker. The smartphone may be substituted with a tablet, a laptop, a smart watch, or the like.

In another embodiment, the user terminal 100 and the output device 200 may correspond to the relationship between a wearable device and a mother device. For example, when a smart watch transmits an audio packet to a smartphone connected via Bluetooth, the smartphone may reproduce the audio packet through its own speaker.

The user terminal 100 and the output device 200 may be homogeneous devices.

For example, both the user terminal 100 and the output device 200 may be smartphones. A first smartphone corresponding to the user terminal 100 transmits an audio packet to a second smartphone corresponding to the output device 200 and the second smartphone may reproduce the received audio packet.

Accordingly, in various embodiments, the user terminal 100 may be referred to as a data providing device, and the output device 200 may be referred to as a data reproducing device.

Various wireless communication protocols may be used to connect the user terminal 100 with the output device 200. For example, the user terminal 100 and the output device 200 may be paired with each other through a Bluetooth link. In addition, various short-range wireless networks, such as Wi-Fi and Wi-Fi direct, may be used for the wireless link. Although various embodiments are described based on Bluetooth in the disclosure, those skilled in the art may apply the technical spirit disclosed in the disclosure to another wireless communication protocol.

The output device 200 may receive an audio packet through the wireless link, and reproduce the received audio packet. The following description will be described with reference to FIGS. 2 to 9 regarding various embodiments for actively controlling the transmission method by the user terminal 100 to prevent the reproduction from being interrupted in the output device 200.

Figure 2:
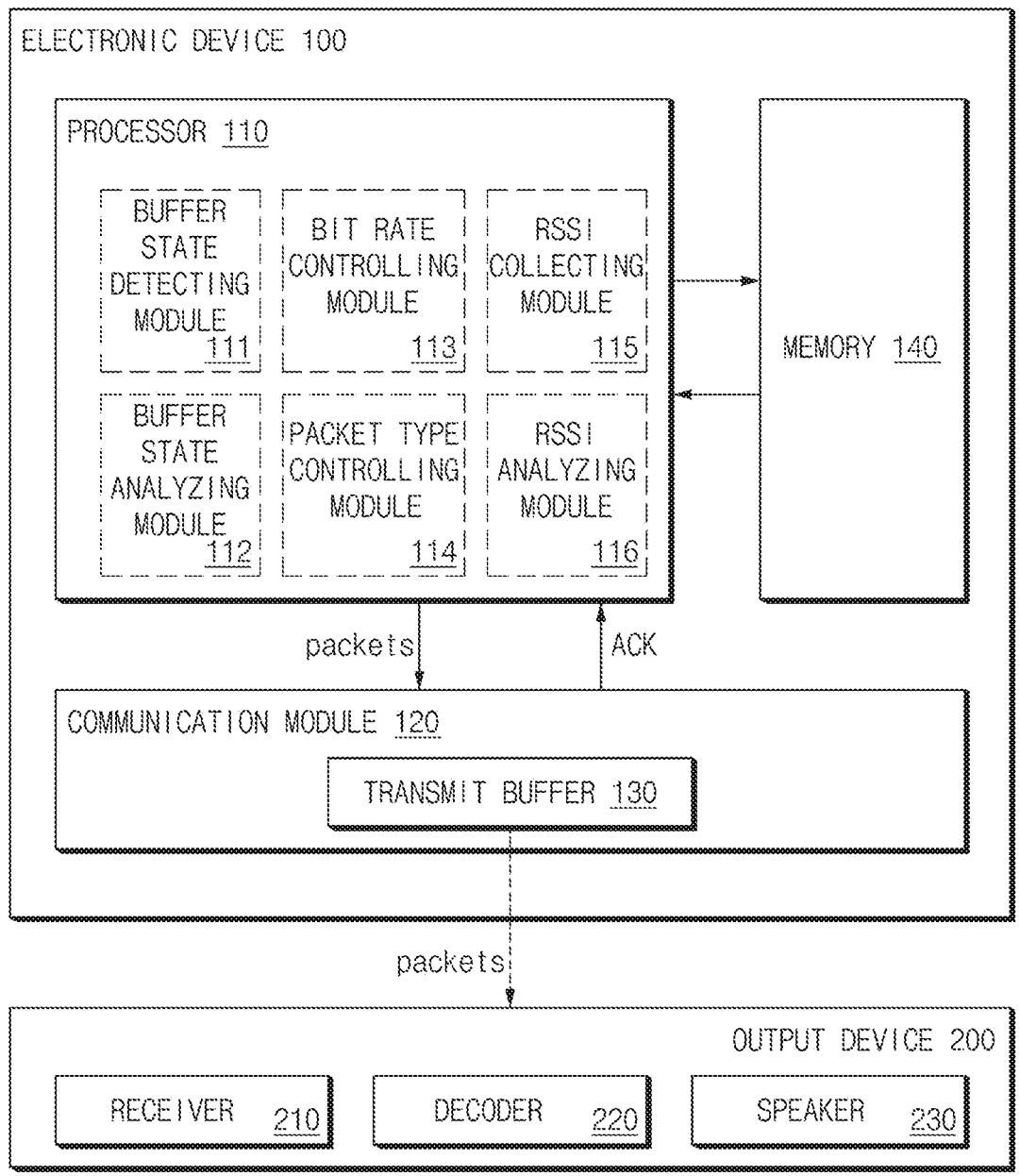
FIG. 2 illustrates components of an electronic device and an output device, according to an embodiment.

FIG. 2 illustrates components of an electronic device and an output device according to an embodiment.

Referring to FIG. 2, the electronic device 100 may include a processor 110, a communication module 120, a transmit buffer 130, and a memory 140. It has been already described that the electronic device 100 may correspond to the user terminal 100 of FIG. 1. In addition, the electronic device 100 may further include various components in addition to the components illustrated in FIG. 2. For example, the hardware/software components described with reference to FIGS. 10 to 12 may be further included as components of the electronic device 100.

The processor 110 may execute instructions stored in the memory 140 to implement various modules. For example, the processor 110 may include a buffer state detecting module 11, a buffer state analyzing module 112, a bit rate controlling module 113, a packet type controlling module 114, a received signal strength indication (RSSI) collecting module 115, and an RSSI analyzing module 116. Accordingly, the operations performed by the following modules may be understood as being performed by the processor 110.

In an embodiment, one or more modules of modules that are able to be implemented by the processor 110 may be implemented as hardware modules. For example, the bit rate controlling module 113, which encodes an audio packet at a specified bit rate, may be implemented as a hardware module.

Further, in an embodiment, one or more modules of the modules that are able to be implemented by the processor 110 may be omitted. For example, when the processor 110 controls the bit rate of an audio packet based only on the state of the transmit buffer 130, the modules 115 and 116 associated with the RSSI may be omitted.

In addition, in an embodiment, the RSSI may be changed to another suitable parameter indicating signal strength or signal quality. Accordingly, the RSSI collecting module 115 and the RSSI analyzing module 116 may be replaced with the signal information collecting module 115 and the signal information analyzing module 116, respectively.

In addition, each "module", which is able to be implemented by the processor 110, may be referred to as a "unit." For example, the buffer state detecting module 111 may be referred to as the buffer state detecting unit 111.

In an embodiment, the buffer state detecting module 111 may continuously collect the state of the transmit buffer 130. The collection may be performed at a specific cycle and/or whenever a specific event occurs. In an embodiment, the state of the transmit buffer 130 may refer to the remaining space of the transmit buffer. For example, when the transmit buffer 130 has a capacity of 10 Mbytes and a transmission waiting packet of 8 Mbyte is stored in the transmit buffer 130, the state of the transmit buffer 130, that is, the remaining space of the transmit buffer corresponds to 2 Mbytes.

In an embodiment, the buffer state analyzing module 112 may determine the loss degree of the transmission packet based on the state of the transmit buffer 130, which is collected by the buffer state detecting module 111, and may decide a bit rate and a packet type to be changed.

In an embodiment, the bit rate controlling module 113 may perform a function of changing the bit rate of an audio packet to a bit rate appropriate to a current transmission situation, based on the decision of the buffer state analyzing module 112.

In an embodiment, the packet type controlling module 114 may perform a function of changing the packet type of an audio packet to a packet type (e.g., a Bluetooth asynchronous packet type) appropriate to a current transmission situation, based on the decision of the buffer state analyzing module 112.

In an embodiment, the RSSI state collecting module 115 may collect RSSI states sensed by the communication module 120. The "RSSI state" may specifically refer to the signal strength between the electronic device 100 and the output device 200, which is measured by the communication module 120.

In an embodiment, the RSSI state analyzing module 116 may determine the signal strength between the electronic device 100 and the output device 200 by using the "RSSI state" collected by the RSSI state collecting module 115, and may assist in deciding the bit rate and the packet type of the audio packet.

The operations performed by the processor 110 may be understood as operations applied at a host layer. For example, the modules 111, 112, 113, 114, 115, and 116 described above may be understood as corresponding to a core stack of a protocol stack for Bluetooth audio transmission.

In addition, operations corresponding to a controller stack of the protocol stack for the Bluetooth audio transmission may be implemented by the communication module 120. The communication module 120 may correspond to a circuitry, a chip, or a partial block of a system on chip (SoC) supporting a wireless link between the electronic device 100 and the output device 200. The communication module 120 may implement a controller in the form of firmware. When the transmit buffer 130 is controlled by the controller, the transmit buffer 130 may be referred to as a controller transmit buffer 130. The term "transmit buffer" or simply "buffer" in the disclosure may be understood as the controller transmit buffer. However, in an embodiment, the transmit buffer 130 may be present in the form of hardware separate from the communication module 120. In another embodiment, the transmit buffer 130 may be implemented by allocating some of addresses of the memory 140.

In an embodiment, the controller may obtain/manage an RSSI value. In an embodiment, operations of some 111, 112, 113, and 114 of the modules constituting the core stack are decided based on the state of the transmit buffer 130, and the operations of the remaining modules 115 and 116 may be decided based on the RSSI value. However, in another embodiment, the operation of the core stack may be determined based on both the state of the transmit buffer 130 and the RSSI value.

According to an embodiment, the processor 110 may form an audio packet, which is encoded at a first bit rate, in a first packet type and may store the audio packet in the transmit buffer 130. In addition, the processor 110 may cause the communication module 120 to transmit the audio packet stored in the transmit buffer 130 to the output device 200. In addition, the processor 110 may encode the audio packet at a second bit rate or may change the packet type to a second packet type based on the state of the transmit buffer 130.

The output device 200 may receive, decode, and output an audio packet from the electronic device 100. To this end, the output device 200 may include a receiver 210 or a communication circuit, a decoder 220, and a speaker 230.

Figure 3:
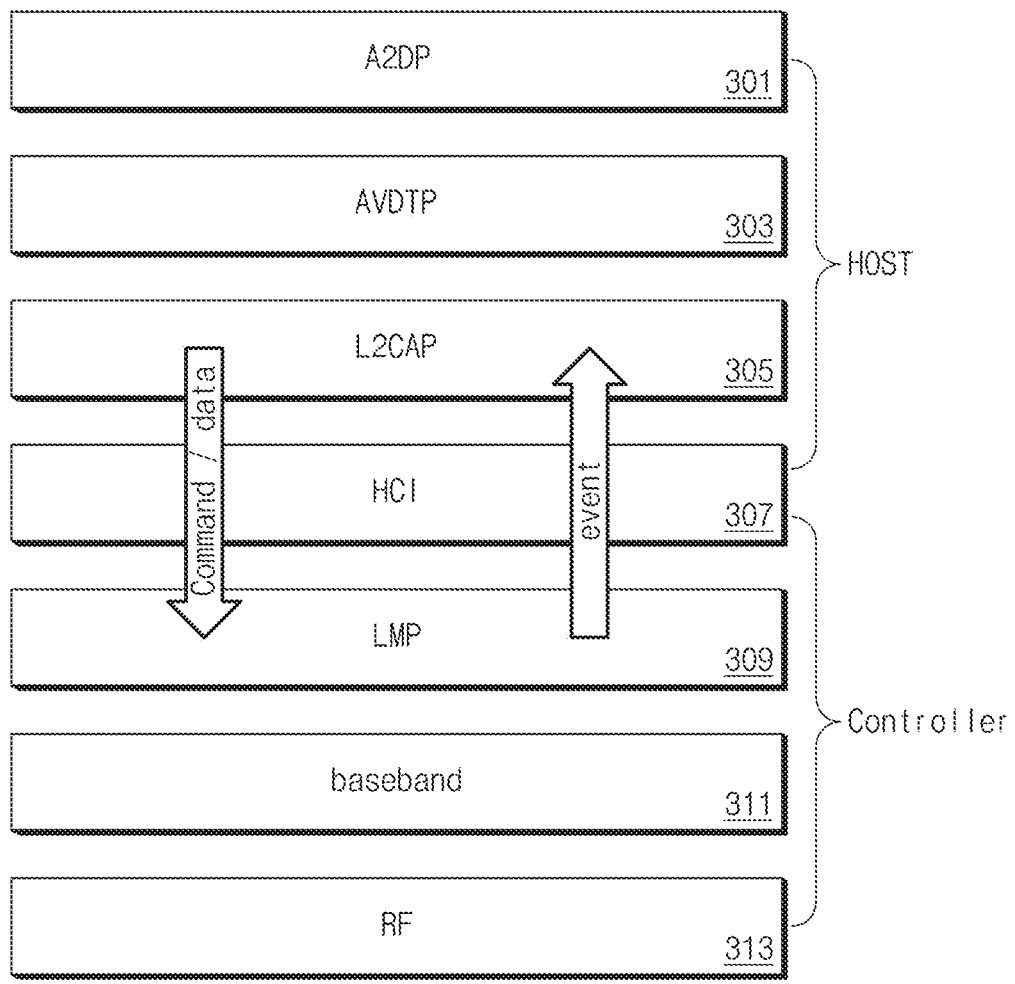
FIG. 3 illustrates a protocol stack for Bluetooth audio transmission, according to an embodiment.

FIG. 3 illustrates the protocol stack for Bluetooth audio transmission, according to an embodiment.

Referring to FIG. 3, the electronic device 100 may sequentially perform packetization and segmentation processes with respect to audio data at each layer illustrated in FIG. 3 and may transmit the audio packet through an RF.

Referring to FIG. 3, the protocol stack may be divided into a host protocol and a (host) controller protocol based on a Host Controller Interface (HCI) 307. A host may transmit a command and data (audio packet) to a controller through the HCI 307, and the controller may report the event to the host through the HCI 307.

For example, the host may transmit an Asynchronous Connection-Less (ACL) packet to the controller. The ACL packet may correspond to an audio packet including audio data. According to the Bluetooth protocol, the host may transmit even a synchronous connection-oriented (SCO) packet to the controller, but the SCO packet will not be described in detail in the disclosure because the SCO packet corresponds to a voice packet that is not retransmitted.

For example, when N audio packets in the transmit buffer 130 are transmitted to the output device 200, the controller may transmit a completed packet event to the host. In this case, the parameter of the completed packet event may have a value of M-N, which corresponds to the remaining buffer, obtained by excluding the number (N) of packets, which have been completely transmitted, from the total number M of packets corresponding to the entire transmit buffer.

In an embodiment, the controller may transmit data to the host via the HCI 307. For example, when the completed packet event occurs, the controller may transmit the RSSI value to the host.

An Advanced Audio Distribution Profile (A2DP) 301 defines a protocol and a procedure for realizing the distribution of mono or stereo-high quality audio contents of an ACL channel.

The audio/video distribution transport protocol (AVDTP) 303 corresponds to a protocol used by the A2DP 301 to stream music to a stereo headset via an L2CAP 305 channel.

The logical link control and adaptation protocol (L2CAP) 305 corresponds to a protocol to directly transmit a packet to the HCI 307 or to another link, such as an ACL, on a hostless system.

The host controller interface (HCI) 307 corresponds to a communication interface between a host stack (e.g., an operating system of a PC or a mobile terminal) and a controller (e.g., a Bluetooth IC).

A link manager protocol (LMP) 309 is used to control a connection between a plurality of devices.

A baseband 311 defines a physical channel and is in charge of hopping for the physical channel. In addition, the baseband 311 may establish an SCO connection used for periodically exchanging a packet through a reserved time slot and for a voice data channel and an ACL connection for exchanging a packet without a reserved time slot and used for a general channel.

A radio frequency (RF) 313 may transmit an audio packet to the output device 200, based on a connection and a packet type defined in the base band 311.

Figure 4:
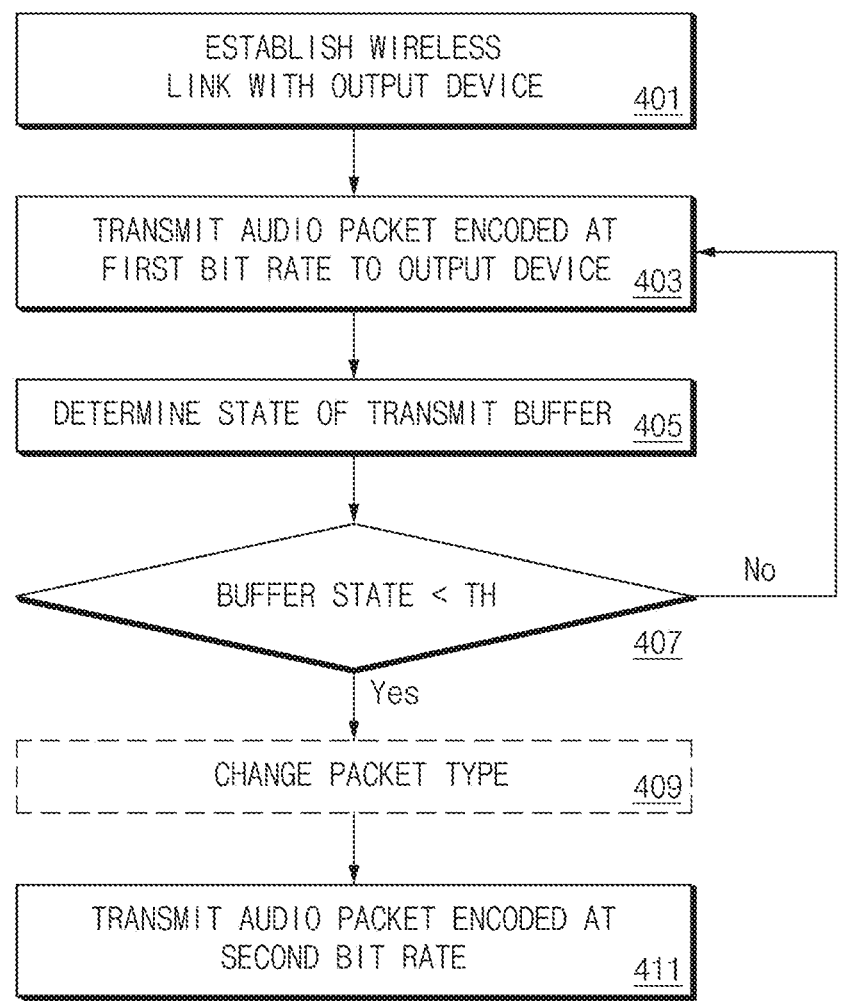
FIG. 4 illustrates a bit rate control operation of an electronic device, according to an embodiment.

FIG. 4 illustrates a bit rate control operation of an electronic device according to an embodiment.

Referring to FIG. 4, in operation 401, the electronic device 100 may establish a wireless link with the output device 200. The wireless link may be, for example, a Bluetooth link. However, the wireless link is not limited to Bluetooth, and various short-range wireless communication protocols such as Wi-Fi and Wi-Fi direct may be used for the wireless link, in addition to Bluetooth as described above.

In operation 403, the electronic device 100 may transmit an audio packet encoded at the first bit rate to the output device 200 via the wireless link. In this case, the first bit rate may be 192 kbps. In addition, the audio packet may correspond to a first packet type (e.g., 2-DH5).

In operation 405, the electronic device 100 may determine the state of the transmit buffer 130. For example, the buffer state detecting module 111 may collect state information (e.g., remaining memory space) of the transmit buffer 130, and the buffer state analyzing module 112 may determine the state of the transmit buffer 130 based on the collected state information. For example, the processor 110 may determine whether the state of the transmit buffer 130 satisfies a threshold condition for maintaining the bit rate. For example, when the threshold condition is 10%, and when the remaining space of the transmit buffer 130 is less than 10% of the total buffer size, the processor 110 may determine that the audio packet is continuously accumulated in the transmit buffer 130 without being transmitted to the output device 200. In another example, when the threshold condition is 5 Mbytes, and when the remaining space of the transmit buffer 130 is larger than 5 Mbytes, the processor 110 may determine that the audio packet is smoothly transmitted to the output device 200.

When the state of the buffer fails to satisfy the threshold condition in operation 407, the electronic device may perform operation 411. For example, the electronic device may encode the audio packet at a second bit rate (e.g., 88 kbps) which is lower than the first bit rate. Alternatively, the electronic device may change the packet type of the audio packet when changing the bit rate. For example, before performing operation 411, the electronic device may change the type of the audio packet to a second type (e.g., 2-DH3) from a first type (e.g., 2-DH5) in operation 409. In detail, the electronic device may decide an appropriate one of a plurality of packet types corresponding to the changed second bit rate.

The electronic device may store the audio packet, which is encoded at the second bit rate that is lower, in the transmit buffer 130. An audio packet encoded at a lower bit rate has a smaller data size based on the same reproduction time, so the state of the transmit buffer 130 of the electronic device 100 may be improved, and the buffer underflow of the output device 200 may be resolved.

Figure 5:
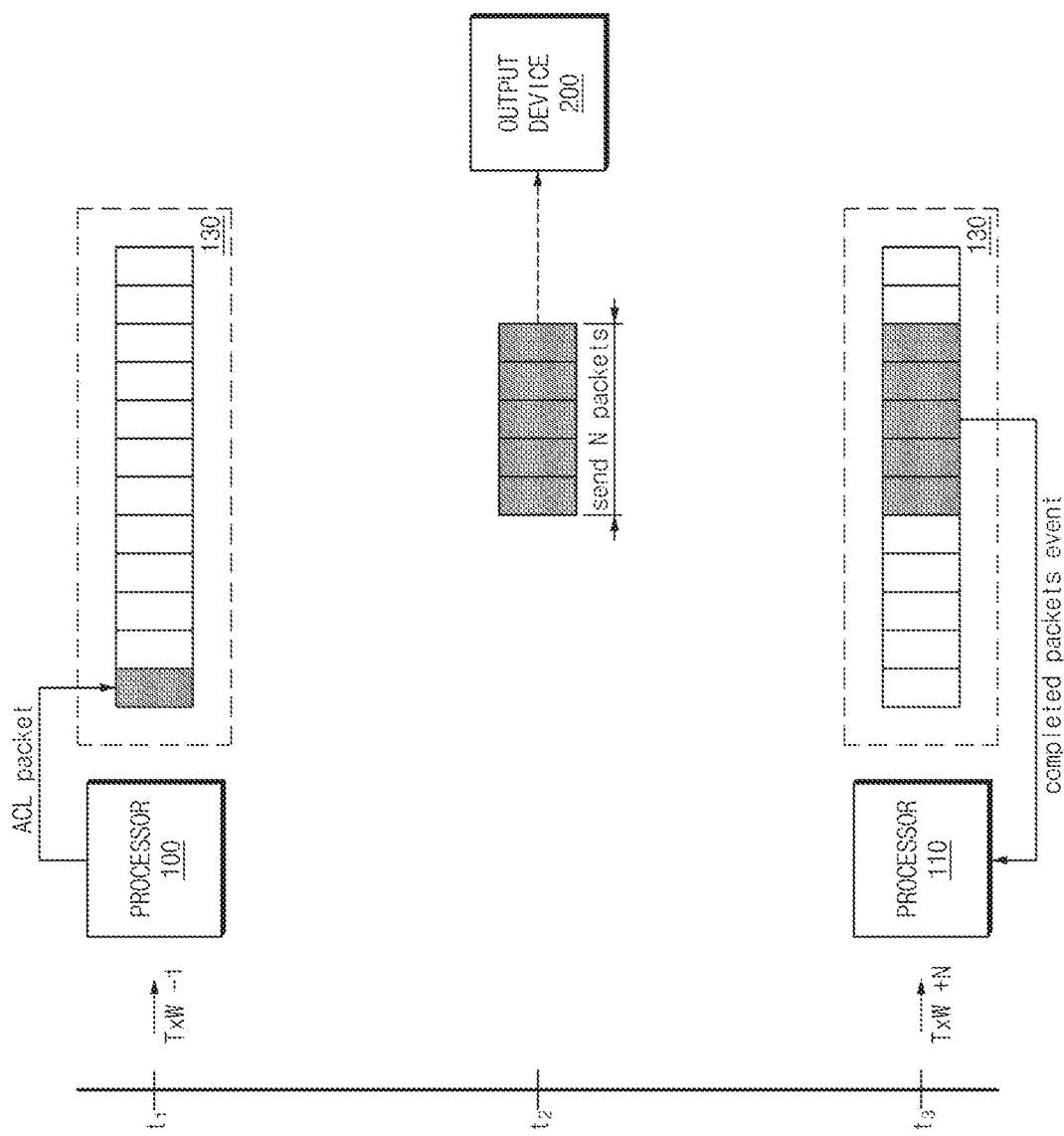
FIG. 5 illustrates a method of determining the state of a transmit buffer, according to an embodiment.

FIG. 5 illustrates a method of determining the state of the transmit buffer, according to an embodiment.

At the first time point t_1, the processor 110 may store one ACL packet in the transmit buffer 130. In this case, the ACL packet is a data packet based on the Bluetooth communication protocol and may be understood as an audio packet.

When one audio packet is added to the transmit buffer 130, the space of the transmit buffer 130 is reduced by one audio packet. A Tx buffer window of the transmit buffer 130 may be understood as being reduced by one. Accordingly, whenever an audio packet is stored in the transmit buffer 130, the processor 110 may reduce the size of the Tx buffer window by one.

At the second time point t_2, the communication module 120 may complete the transmission of N audio packets to the output device 200. When the transmission is completed, the communication module 120 may provide a transmission completion event to the processor 110 at t_3. In an embodiment, t_2 and t_3 may correspond to substantially the same time point because the communication module 120 generates the transmission completion event immediately as soon as the transmission of the audio packet is completed.

Upon receiving the transmission completion event, the processor 110 may determine that a free space corresponding to N audio packets is ensured in the transmit buffer 130. Accordingly, the processor 110 may increase the size of the Tx buffer window by N.

The processor 110 may determine whether the size of the Tx buffer window is less than a specified value at a specific time point. When the size of the Tx buffer window is less than the specified value at the specific time point, the processor 110 may determine the remaining space of the transmit buffer 130 as becoming less than the threshold value, and may lower the bit rate of the audio packet to be stored in the transmit buffer 130.

In an embodiment, the processor 110 may control the bit rate based on the moving value 1 of the Tx buffer window. For example, the processor 110 may measure the size of the Tx buffer window every 1 ms. The processor 110 may collect the states of the transmit buffer 130 at a cycle of 'n' ms and may calculate a moving average at each period to determine whether the change in the bit rate and the packet type of an audio CODEC is necessary. The determination cycle (n ms) may be defined to be equal to or less than the packet transmission cycle.

The scheme using the moving average may also be applied to the case where the RSSI to be described later is supplementarily utilized. Content associated with the RSSI will be described later.

Figure 6:
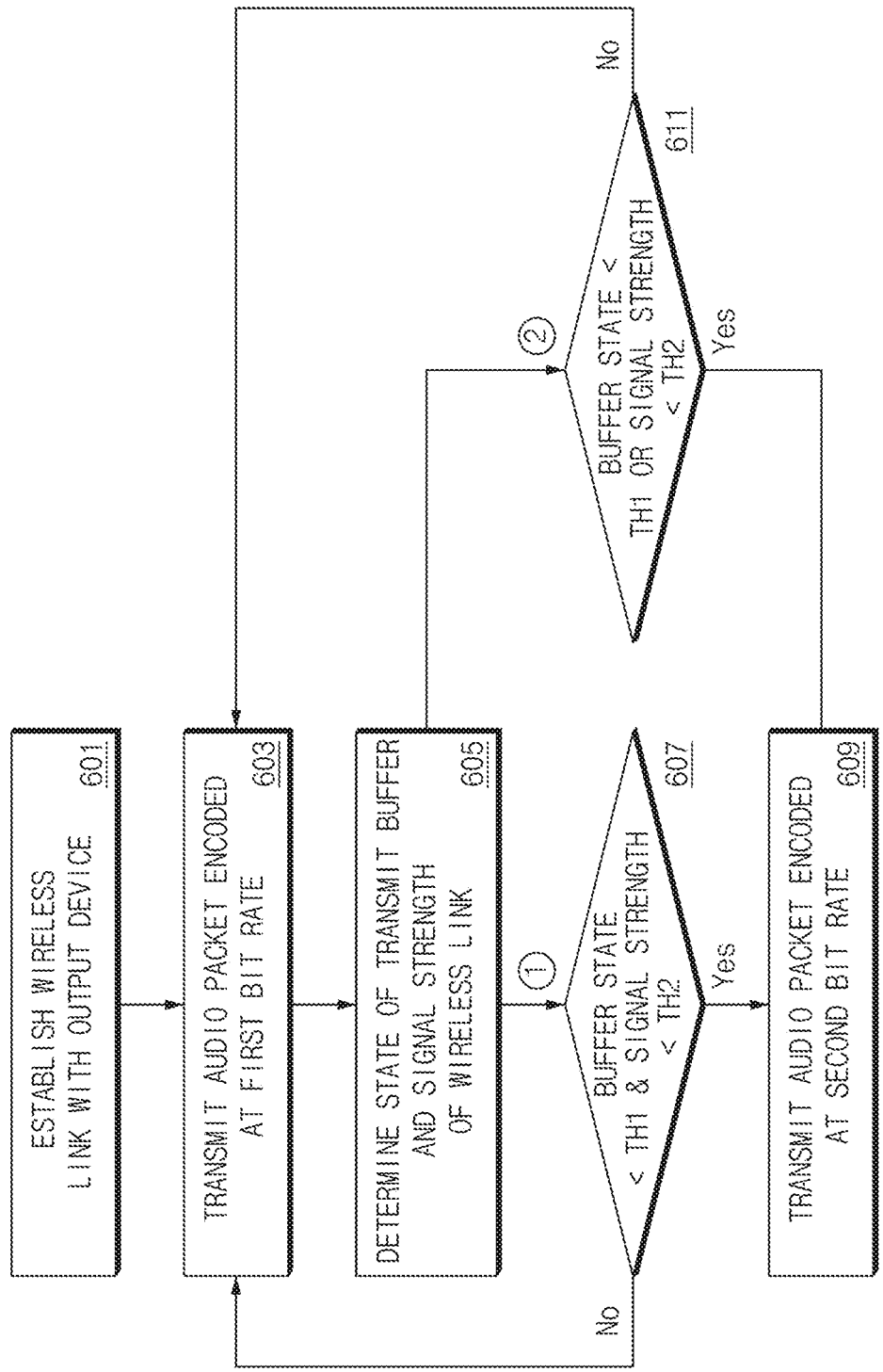
FIG. 6 illustrates a method of controlling a bit rate based on a buffer state and signal strength, according to an embodiment.

FIG. 6 illustrates a method of controlling a bit rate based on the buffer state and the signal strength, according to an embodiment.

Referring to FIG. 6, operations 601 and 603 may correspond to operations 401 and 403 in FIG. 4.

In operation 605, the electronic device 100 may determine the state of the transmit buffer 130 and the signal strength (e.g., RSSI) of the wireless link. The electronic device 100 may change the bit rate of the audio packet to be stored in the transmit buffer based on the state of the transmit buffer and the signal strength of the wireless link, depending on the determination result. In FIG. 6, a first scenario and a second scenario will be separately described below.

According to the first scenario, in operation 607, the electronic device 100 determines whether the state of the transmit buffer 130 satisfies a first threshold condition and the signal strength satisfies the second threshold condition. For example, when the state of the transmit buffer fails to satisfy the first threshold condition and when the signal strength fails to satisfy the second threshold condition, the electronic device 100 may change the bit rate of the audio packet, which is to be stored in the transmit buffer, from the first bit rate to the second bit rate in operation 609. In other words, the electronic device 100 may perform the change in the bit rate when both the state of the buffer and the signal strength fail to satisfy the respective threshold conditions.

According to the first scenario, although the state of the wireless link between the electronic device 100 and the output device 200 may be temporarily deteriorated, the state of the buffer may be fine. In other words, sufficient audio packets may have been already transmitted to the output device 200. Accordingly, when the state of the buffer becomes less than the threshold condition to be deteriorated, the electronic device 100 may perform the change in the bit rate. Alternatively, although the state of the buffer becomes less than the threshold condition to be deteriorated, when the signal strength is sufficiently fine, the state of the buffer may be expected to be immediately recovered to a level satisfying the threshold condition. Therefore, although the state of the buffer becomes less than the threshold condition, when the signal strength is fine, the current bit rate may be continuously maintained.

According to the second scenario, in operation 611, when the state of the buffer fails to satisfy the first threshold condition or when the signal strength fails to satisfy the second threshold condition, the electronic device 100 may lower the bit late of the audio packet, which is to be stored in the transmit buffer 130, from the first bit rate to the second bit rate in operation 609. In other words, the electronic device 100 may perform the change in the bit rate when any one of the state of the buffer or the signal strength fails to satisfy the threshold condition.

The first scenario may be useful when the user considers the quality of the reproduced sound to be important, and the second scenario may be useful when the user considers seamless reproduction to be important. For example, a user of the electronic device 100 may set priorities for the sound quality and the seamless reproduction in the settings of a music reproducing application or device settings of the electronic device 100. For example, when the user sets the priority of the sound quality to be higher than the priority of reproduction, the electronic device 100 may operate in the first scenario. However, when the user sets the priority of the reproduction to be higher than the priority of the sound quality, the electronic device 100 may operate in the second scenario.

Even in the embodiment illustrated in FIG. 6, the moving average scheme described with reference to FIG. 5 may be used. For example, the state of the transmit buffer described with reference to FIG. 6 may correspond to an average size of the remaining amount of the transmit buffer 130 over a specific time period. The RSSI value may correspond to an average value of the RSSI values corresponding to a specific time period.

In an embodiment, the electronic device 100 may use moving average schemes corresponding to mutual different periods. For example, in relation to an arbitrary unit time (e.g., 0.1 second), any one of a moving average value corresponding to 5 unit times, a moving average value corresponding to 10 unit times, or a moving average value corresponding to 50 unit times may be used to determine the state of the transmit buffer. An appropriate unit time may be decided experimentally or theoretically. For example, the electronic device may determine the state of the transmit buffer based on the average size of the transmit buffers and/or the average size of RSSI values corresponding to 20 unit times (e.g., 2 seconds).

In another embodiment, the electronic device 100 may simultaneously use moving average values corresponding to mutually different unit times to determine the state of the transmit buffer. For example, the electronic device 100 may determine the state of the transmit buffer 130 by using a plurality of moving average values among moving average values corresponding to 5, 10, and 50 unit time. For example, in the state that the moving average value corresponding to 50 unit times satisfies the first threshold condition, when the moving average value corresponding to 10 unit times satisfies the second threshold condition, the bit rate of the packet stored in the transmit buffer 130 may be determined to be changed.

Figure 7:
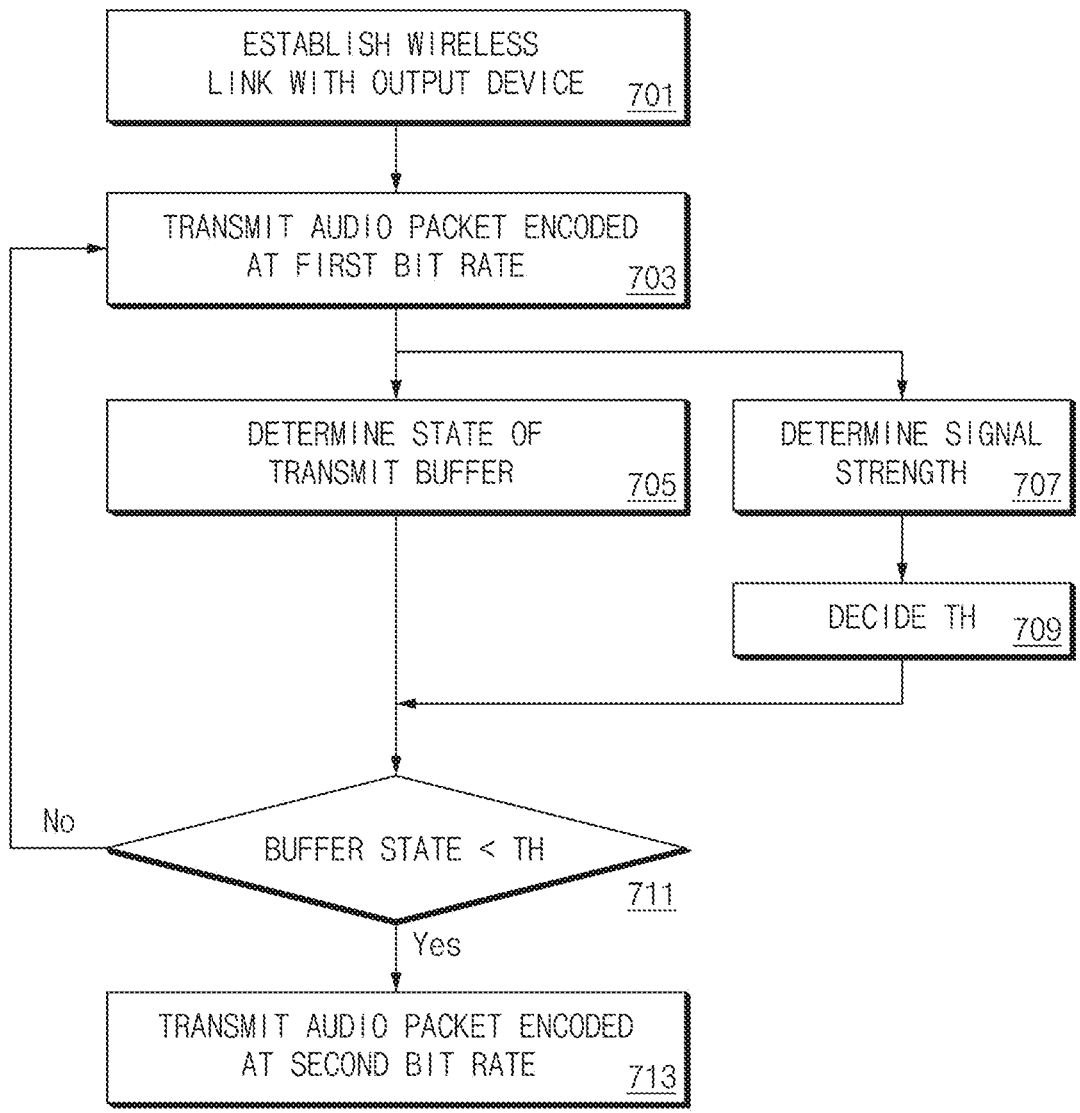
FIG. 7 illustrates a method of differently setting a threshold condition to be applied to the determination of the state of a transmit buffer based on the signal strength, according to an embodiment.

FIG. 7 illustrates a method of differently setting a threshold condition to be applied to the determination of the state of a transmit buffer based on the signal strength, according to an embodiment.

Referring to FIG. 7, operations 701 and 703 may correspond to operations 401 and 403 in FIG. 7.

After performing the operation 703, the electronic device 100 may determine both the state of the transmit buffer and the signal strength. For example, the electronic device 100 may determine the state of the transmit buffer 130 in operation 705 and may determine the signal strength in operation 707.

In operation 709, the electronic device 100 may decide a threshold condition to be applied to determination of the state of the transmit buffer based on the determined signal strength. For example, when the signal strength is relatively fine, the threshold condition may be decided as requiring that the remaining space of the transmit buffer 130 is 10% or more. In this case, when the remaining space of the transmit buffer 130 is reduced to less than 10%, the electronic device 100 may reduce the bit rate. However, when the signal strength is relatively bad, the threshold condition may be decided as requiring that the remaining space of the transmit buffer 130 is 20% or more. In other words, in this case, when the remaining space of the transmit buffer 130 is reduced to less than 20%, the electronic device 100 may reduce the bit rate of an audio packet to be stored in the transmit buffer 130 even though a larger number of audio packets have been transmitted to the output device 200 as compared to the case that the signal strength is fine.

Operations 711 and 713 may correspond to operations 407 and 411 of FIG. 4. Operation 713 may correspond to operation 409 and operation 411 in FIG. 4.

Figure 8:
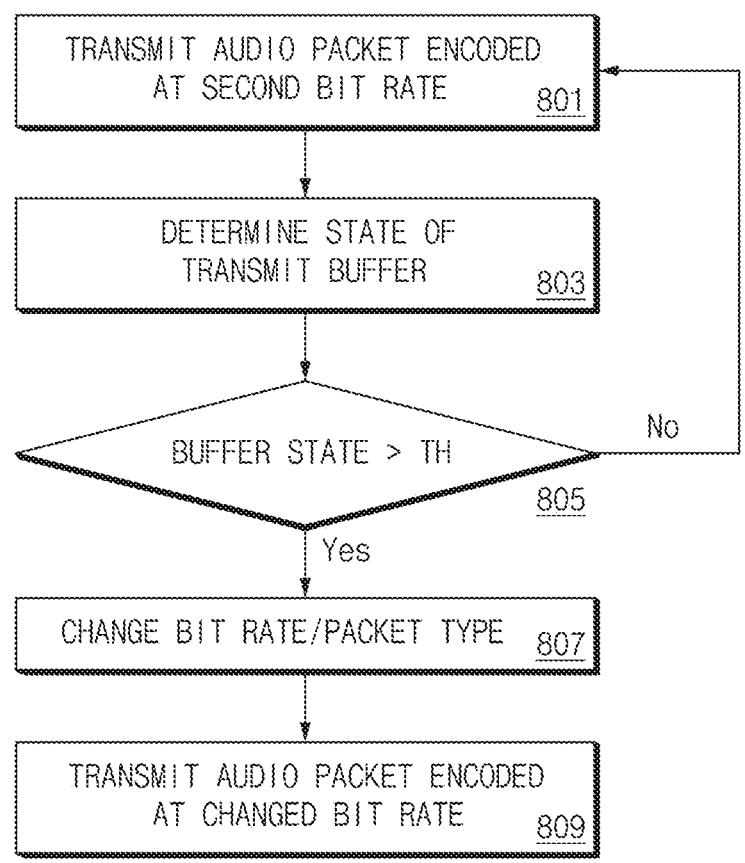
FIG. 8 illustrates a method of adjusting up the bit rate, according to an embodiment.

FIG. 8 illustrates a method of adjusting up the bit rate according to an embodiment.

Referring to FIG. 8, in operation 801, the electronic device 100 may transmit an audio packet, which is encoded at the second bit rate, to the output device 200. In this case, the second bit rate may correspond to a bit rate lower than the first bit rate of FIG. 4.

In operation 803, the electronic device 100 may determine the state of the transmit buffer 130. When the state of the transmit buffer 130 satisfies the threshold condition in operation 805, the electronic device 100 may change the bit rate and/or the packet type of the audio packet in operation 807. For example, when the state of the transmit buffer 130 satisfies the threshold condition while the communication module 120 transmits the audio packet, which is encoded at the second bit rate, to the output device 200, the processor 110 may adjust up the bit rate of the audio packet to the first bit rate, or may decide the bit rate of the audio packet to be a third bit rate higher than the second bit rate, and may store an audio packet, which is encoded at the changed bit rate (e.g., the first bit rate or the third bit rate) in the transmit buffer 130.

In operation 809, the electronic device 100 may transmit the audio packet, which is encoded at the changed bit rate and stored in the transmit buffer 130, to the output device 200.

Although the embodiment of FIG. 8 has been described regarding the method of adjusting up the bit rate by considering only the state of the transmit buffer 130, the method applied to FIG. 6 and FIG. 7 may also be applied to FIG. 8. In detail, the method of adjusting down the bit rate in FIGS. 6 and 7 may be reversely applied to adjusting up the bit rate in FIG. 8. For example, the electronic device 100 may adjust up the bit rate when both the state of the transmit buffer 130 and the state of the signal strength satisfy the respective threshold conditions.

Figure 9:
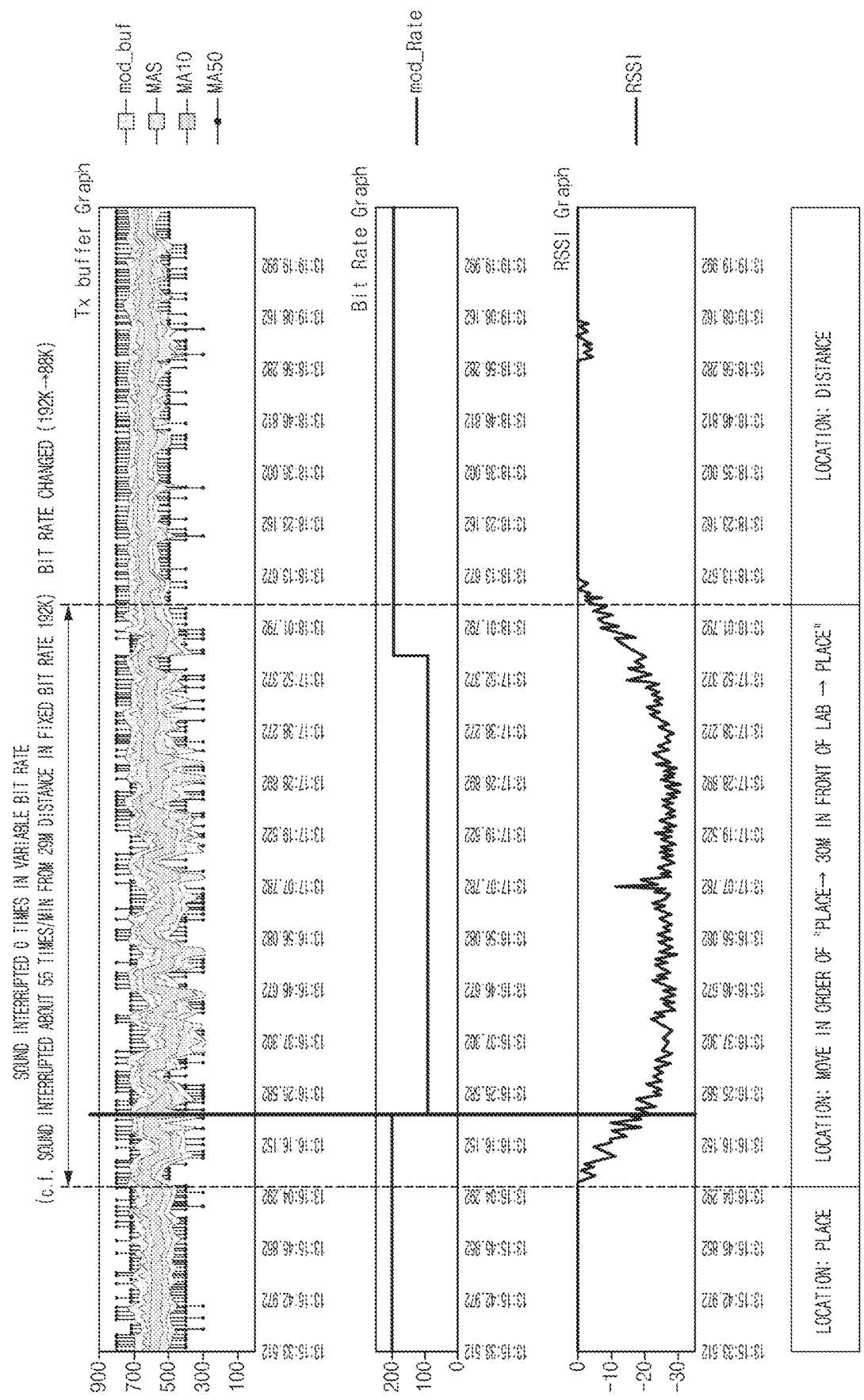
FIG. 9 illustrates a test result of the change in the bit rate, according to an embodiment.

FIG. 9 illustrates a test result of the change in the bit rate, according to an embodiment.

Referring to FIG. 9, the electronic device 100, to which an embodiment described in the disclosure is applied, may have the effect of significantly lowering the occurrence rate of sound interruption as compared to a user terminal that the embodiment described in the disclosure is not applied. When the sound interruption is expected, the operations of changing the bit rate of the audio codec according to various embodiments and changing a Bluetooth packet type appropriate to the bit rate of the changed audio codec may be first and actively performed.

In an embodiment of FIG. 9, the bit rate of the audio codec was set to be changed between a higher bit rate (e.g., the first bit rate) of 192 kbps and a lower bit rate (e.g., the second bit rate) of 88 kbps. The packet type of the audio packet was set to be 2-DH5 at 192 kbps, and 2-DH5, 2-DH3 or DM5 at 88 kbps.

The upper graph in FIG. 9 illustrates the current value, a 5-period moving average (MA5), a 10-period meaning average (MA10), and a 50-period moving average (MA50) in a controller transmit buffer, which are collected at every cycle. The intermediate graph illustrates the bit rate of the audio packet actually transmitted by the electronic device 100 in the same time range. The lower graph illustrates the change in the RSSI of the wireless link between the electronic device 100 and the output device 200. As the distance between the electronic device 100 and the output device 200 is increased, the phenomenon that the RSSI is reduced may be identified.

Referring to FIG. 9, 192-kbps transmission was possible without sound interruption in the period between a starting time point and 30 seconds, in which the electronic device 100 was closer to the output device 200. Accordingly, the bit rate was maintained to 192 kbps.

In the period between 30 seconds and 2 minutes and 30 seconds, the electronic device 100 was moved such that the electronic device 100 and the output device 200 were spaced apart from each other by a distance of up to 30 m and then became close to each other again. In this case, it may be identified that, when the bit rate was maintained to 192 kbps in an earlier stage and then it was sensed that the value of the controller transmit buffer was reduced to a specific threshold or less, the bit rate was changed to 88 kbps. Thereafter, it may be identified that when the electronic device 100 was close to the output device 200 again, so the value of the controller transmit buffer was increased to a specific threshold condition or more, the bit rate was adjusted up to be 192 kbps The bit rate was continuously maintained to 192 kbps in the period after the period of 2 minutes and 30 seconds in which the electronic device 100 was maintained to be close to the output device 200.

During the entire period of this experiment, no sound interruption occurred in the terminal-headset to which the bit rate variable function was applied. However, when a test was performed with a terminal-headset having the fixed bit rate of 192 kbps under the same experimental conditions, it may be identified that the frequent sound interruptions occurred to the extent of about 55 times/minute at the period (30 seconds-2 minutes 30 seconds) in which two devices were spaced apart from each other.

Figure 10:
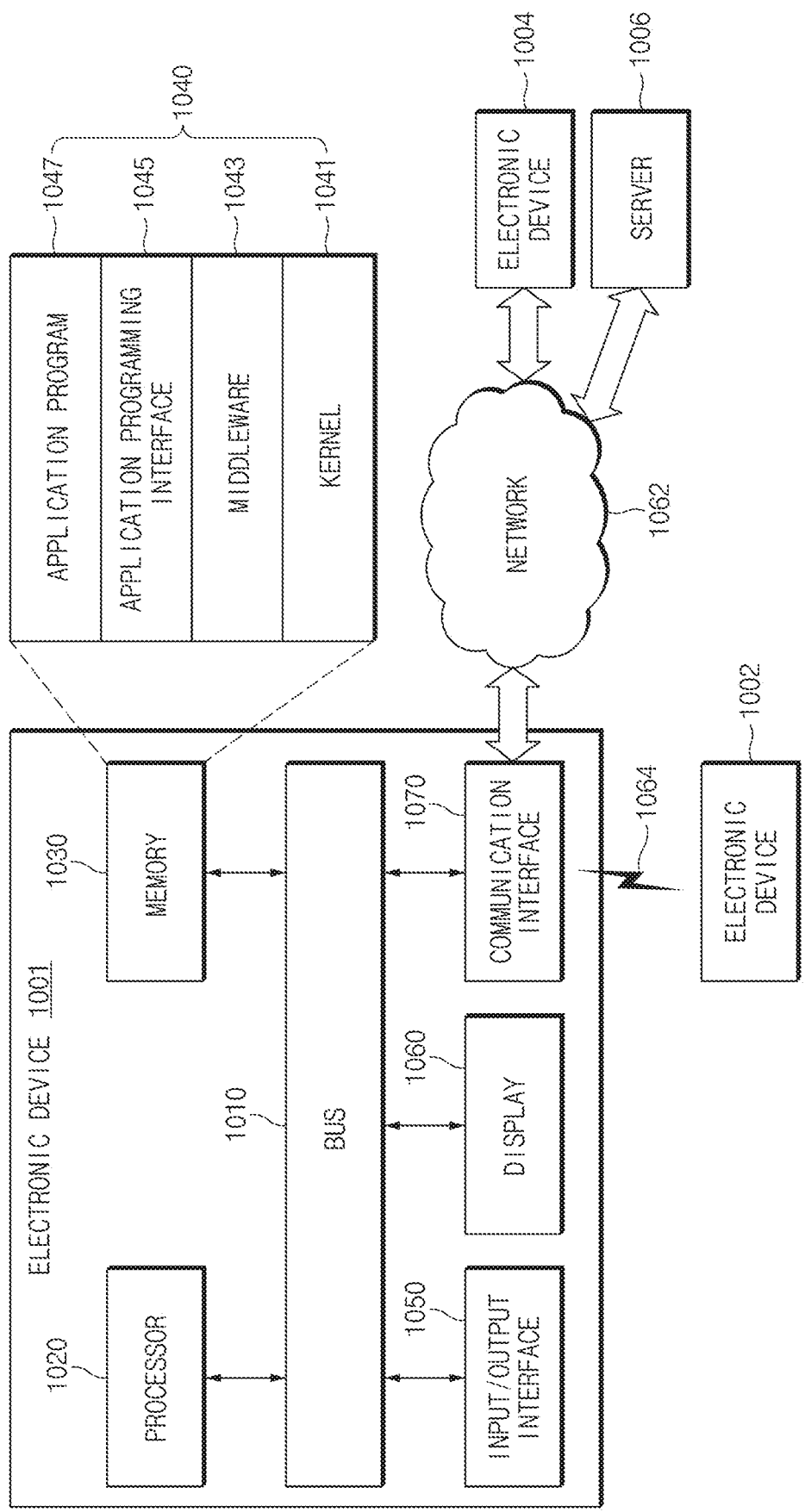
FIG. 10 illustrates an electronic device in a network environment according to an embodiment of the present disclosure.

FIG. 10 illustrates an electronic device in a network environment according to an embodiment of the present disclosure.

An electronic device 1001 in a network environment 1000 according to various embodiments of the present disclosure will be described with reference to FIG. 10. The electronic device 1001 may include a bus 1010, a processor 1020, a memory 1030, an input/output interface 1050, a display 1060, and a communication interface 1070. In various embodiments of the present disclosure, at least one of the foregoing elements may be omitted or another element may be added to the electronic device 1001.

The bus 1010 may include a circuit for connecting the above-mentioned elements 1010 to 1070 to each other and transferring communications (e.g., control messages and/or data) among the above-mentioned elements.

The processor 1020 may include at least one of a central processing unit (CPU), an application processor (AP), or a communication processor (CP). The processor 1020 may perform data processing or an operation related to communication and/or control of at least one of the other elements of the electronic device 1001.

The memory 1030 may include a volatile memory and/or a nonvolatile memory. The memory 1030 may store instructions or data related to at least one of the other elements of the electronic device 1001. According to an embodiment of the present disclosure, the memory 1030 may store software and/or a program 1040. The program 1040 may include, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS).

The kernel 1041 may control or manage system resources (e.g., the bus 1010, the processor 1020, the memory 1030, or the like) used to perform operations or functions of other programs (e.g., the middleware 1043, the API 1045, or the application program 1047). Furthermore, the kernel 1041 may provide an interface for allowing the middleware 1043, the API 1045, or the application program 1047 to access individual elements of the electronic device 1001 in order to control or manage the system resources.

The middleware 1043 may serve as an intermediary so that the API 1045 or the application program 1047 communicates and exchanges data with the kernel 1041.

Furthermore, the middleware 1043 may handle one or more task requests received from the application program 1047 according to a priority order. For example, the middleware 1043 may assign at least one application program 1047 a priority for using the system resources (e.g., the bus 1010, the processor 1020, the memory 1030, or the like) of the electronic device 1001. For example, the middleware 1043 may handle the one or more task requests according to the priority assigned to the at least one application, thereby performing scheduling or load balancing with respect to the one or more task requests.

The API 1045, which is an interface for allowing the application 1047 to control a function provided by the kernel 1041 or the middleware 1043, may include, for example, at least one interface or function (e.g., instructions) for file control, window control, image processing, character control, or the like.

The input/output interface 1050 may serve to transfer an instruction or data input from a user or another external device to (an)other element(s) of the electronic device 1001. Furthermore, the input/output interface 1050 may output instructions or data received from (an)other element(s) of the electronic device 1001 to the user or another external device.

The display 1060 may include, for example, a liquid crystal display (LCD), a light-emitting diode (LED) display, an organic light-emitting diode (OLED) display, a microelectromechanical systems (MEMS) display, or an electronic paper display. The display 1060 may present various content (e.g., a text, an image, a video, an icon, a symbol, or the like) to the user. The display 1060 may include a touch screen, and may receive a touch, gesture, proximity or hovering input from an electronic pen or a part of a body of the user.

The communication interface 1070 may set communications between the electronic device 1001 and an external device (e.g., a first external electronic device 1002, a second external electronic device 1004, or a server 1006). For example, the communication interface 1070 may be connected to a network 1062 via wireless communications or wired communications so as to communicate with the external device (e.g., the second external electronic device 1004 or the server 1006).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1064. The short-range communications may include at least one of wireless fidelity (Wi-Fi), Bluetooth, near field communication (NFC), magnetic stripe transmission (MST), or GNSS.

The MST may generate a pulse by using electro-magnetic signals according to transmission data, and the pulse may cause magnetic signals. The electronic device 1001 may transmit the magnetic signals to a point of sales (POS). The POS may detect the magnetic signals using a MST reader and obtain the transmission data by converting the magnetic signals to electronic signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1062 may include at least one of telecommunications networks, for example, a computer network (e.g., local area network (LAN) or wide area network (WAN)), the Internet, or a telephone network.

The types of the first external electronic device 1002 and the second external electronic device 1004 may be the same as or different from the type of the electronic device 1001. According to an embodiment of the present disclosure, the server 1006 may include a group of one or more servers. A portion or all of operations performed in the electronic device 1001 may be performed in one or more other electronic devices (e.g., the first electronic device 1002, the second external electronic device 1004, or the server 1006). When the electronic device 1001 should perform a certain function or service automatically or in response to a request, the electronic device 1001 may request at least a portion of functions related to the function or service from another device (e.g., the first electronic device 1002, the second external electronic device 1004, or the server 1006) instead of or in addition to performing the function or service for itself. The other electronic device (e.g., the first electronic device 1002, the second external electronic device 1004, or the server 1006) may perform the requested function or additional function, and may transfer a result of the performance to the electronic device 1001. The electronic device 1001 may use a received result itself or additionally process the received result to provide the requested function or service. To this end, for example, a cloud computing technology, a distributed computing technology, or a client-server computing technology may be used.

Figure 11:
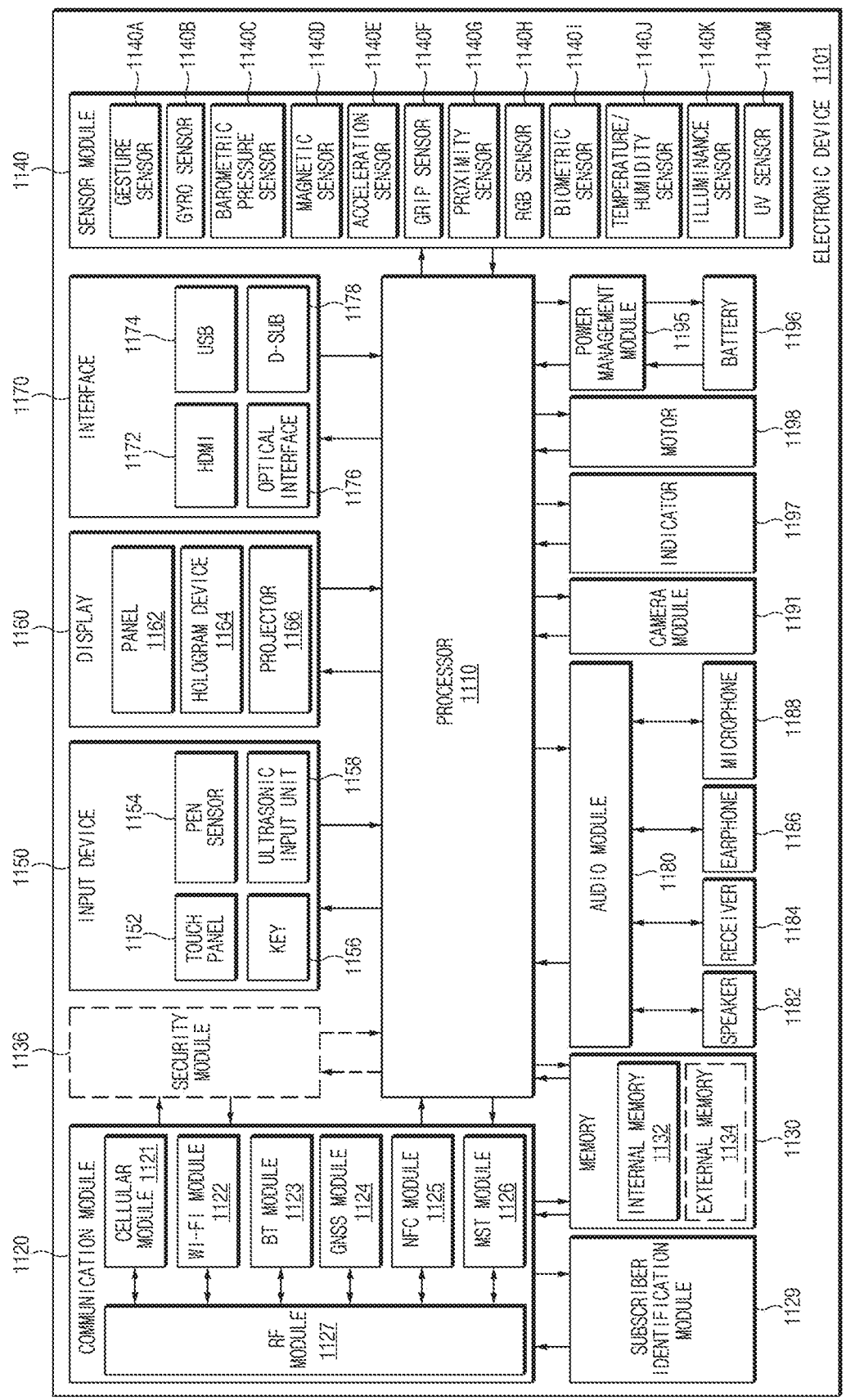
FIG. 11 is a block diagram illustrating an electronic device according to an embodiment of the present disclosure.

FIG. 11 is a block diagram illustrating an electronic device according to an embodiment of the present disclosure.

Referring to FIG. 11, the electronic device 1101 may include, for example, a part or the entirety of the electronic device 1001 illustrated in FIG. 10. The electronic device 1101 may include at least one processor (e.g., an AP) 1110, a communication module 1120, a subscriber identification module (SIM) 1129, a memory 1130, a sensor module 1140, an input device 1150, a display module 1160, an interface 1170, an audio module 1180, a camera module 1191, a power management module 1195, a battery 1196, an indicator 1197, and a motor 1198.

The processor 1110 may execute, or run, an operating system (OS) or an application program so as to control a plurality of hardware or software elements connected to the processor 1110, process various data, and perform operations. The processor 1110 may be implemented with, for example, an SoC. According to an embodiment of the present disclosure, the processor 1110 may further include a graphics processing unit (GPU) and/or an image signal processor. The processor 1110 may include at least a portion (e.g., a cellular module 1121) of the elements illustrated in FIG. 11. The processor 1110 may load, on a volatile memory, an instruction or data received from at least one of the other elements (e.g., a nonvolatile memory) to process the instruction or data, and may store various data in a nonvolatile memory.

The communication module 1120 may be configured the same as or similar to that of the communication circuit 1020 of FIG. 10. The communication module 1120 may include, for example, a cellular module 1121 (e.g., a modem), a WiFi module 1122, a Bluetooth module 1123, a global navigation satellite system (GNSS) module 1124 (e.g., a global positioning system (GPS) module, a global navigation satellite system (GLONASS) module, a BeiDou navigation satellite system module, or a Galileo global navigation satellite system module), a near field communication (NFC) module 1125, a magnetic secure transmission (MST) module 1126, and a radio frequency (RF) module 1127.

The cellular module 1121 may provide, for example, a voice call service, a video call service, a text message service, or an Internet service through a communication network. The cellular module 1121 may identify and authenticate the electronic device 1101 in the communication network using the SIM 1129 (e.g., a SIM card). The cellular module 1121 may perform at least a part of the functions that may be provided by the processor 1110. The cellular module 1121 may include a CP.

Each of the WiFi module 1122, the Bluetooth module 1123, the GNSS module 1124, the NFC module 1125, and the MST module 1126 may include, for example, a processor for processing data transmitted/received through the modules. According to an embodiment of the present disclosure, at least a part (e.g., two or more) of the cellular module 1121, the WiFi module 1122, the Bluetooth module 1123, the GNSS module 1124, the NFC module 1125, and the MST module 1126 may be included in a single integrated circuit (IC) or IC package.

The RF module 1127 may transmit/receive, for example, communication signals (e.g., RF signals). The RF module 1127 may include, for example, a transceiver, a power amplifier module (PAM), a frequency filter, a low noise amplifier (LNA), an antenna, or the like. According to an embodiment of the present disclosure, at least one of the cellular module 1121, the WiFi module 1122, the Bluetooth module 1123, the GNSS module 1124, the NFC module 1125, or the MST module 1126 may transmit/receive RF signals through a separate RF module.

The SIM 1129 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 1130 (e.g., the memory 1060 of FIG. 10) may include, for example, an internal memory 1132 or an external memory 1134. The internal memory 1132 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1134 may include a flash drive such as a compact flash (CF) drive, a secure digital (SD) drive, a micro-SD drive, a mini-SD drive, an extreme digital (xD) drive, a multimedia card (MMC), a memory stick, or the like. The external memory 1134 may be operatively and/or physically connected to the electronic device 1101 through various interfaces.

A security module 1136, which is a module including a storage space that is more secure (e.g. has a higher security level) than the memory 1130, may be a circuit for providing secure data storage and protected execution circumstances. The security module 1136 may be implemented with an additional circuit and may include an additional processor. The security module 1136 may be present in an attachable smart chip or SD card, or may include an embedded secure element (eSE), which is installed in a fixed chip. Additionally, the security module 1136 may be driven in another OS which is different from the OS of the electronic device 1101. For example, the security module 1136 may operate based on a java card open platform (JCOP) OS.

The sensor module 1140 may, for example, measure a physical quantity or detect an operation state of the electronic device 1101 so as to convert measured or detected information into an electrical signal. The sensor module 1140 may include, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) light sensor 1140M. Additionally, or alternatively, the sensor module 1140 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In an embodiment of the present disclosure, the electronic device 1101 may further include a processor configured to control the sensor module 1140 as a part of the processor 1110 or separately, so that the sensor module 1140 is controlled while the processor 1110 is in a reduced power, or sleep, state.

The input device 1150 may include, for example, a touch panel 1152, a (digital) pen sensor 1154, a key 1156, or an ultrasonic input device 1158. The touch panel 1152 may employ at least one of a capacitive method, a resistive method, an infrared method, and an ultraviolet light sensing method. The touch panel 1152 may further include a control circuit. The touch panel 1152 may further include a tactile layer so as to provide a haptic feedback to a user.

The (digital) pen sensor 1154 may include, for example, a sheet for recognition which is a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display module 1160 (e.g., the display 1070 of FIG. 10) may include a panel 1162, a hologram device 1164, or a projector 1166. The panel 1162 may be configured the same as or similar to that of the display 1070 of FIG. 10. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed internally or externally to the electronic device 1101. According to an embodiment of the present disclosure, the display module 1160 may further include a control circuit for controlling the panel 1162, the hologram device 1164, or the projector 1166.

The interface 1170 may include, for example, a high definition multimedia interface (HDMI) 1172, a universal serial bus (USB) 1174, an optical interface 1176, or a D-subminiature (D-sub) connector 1178. The interface 1170, for example, may be included in the communication circuit 1020 of FIG. 10. Additionally, or alternatively, the interface 1170 may include, for example, a mobile high-definition link (MHL) interface, an SD/MMC interface, or an Infrared Data Association (IrDA) interface.

The audio module 1180 may convert, for example, a sound into an electrical signal or vice versa. The audio module 1180 may process sound information input or output through a speaker 1182, a receiver 1184, an earphone 1186, or the microphone 1188.

The camera module 1191 is, for example, a device for taking a still image or a video. According to an embodiment of the present disclosure, the camera module 1191 may include at least one image sensor (e.g., a front sensor or a rear sensor), a lens, an image signal processor (ISP), or a flash (e.g., a light emitting diode (LED) or a xenon lamp).

The power management module 1195 may manage power of the electronic device 1101. According to an embodiment of the present disclosure, the power management module 1195 may include a power management integrated circuit (PMIC), a charger IC, a battery, or a battery gauge. The PMIC may employ a wired and/or a wireless charging method. A wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current, or temperature thereof while the battery is charged. The battery 1196 may include, for example, a rechargeable battery and/or a solar battery.

The indicator 1197 may display a certain state of the electronic device 1101 or a part thereof (e.g., the processor 1110), such as a booting state, a message state, a charging state, or the like. The motor 1198 may convert an electrical signal into a mechanical vibration, and may generate a vibration or a haptic effect. A processing device (e.g., a GPU) for supporting mobile TV may be included in the electronic device 1101. The processing device for supporting mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 12:
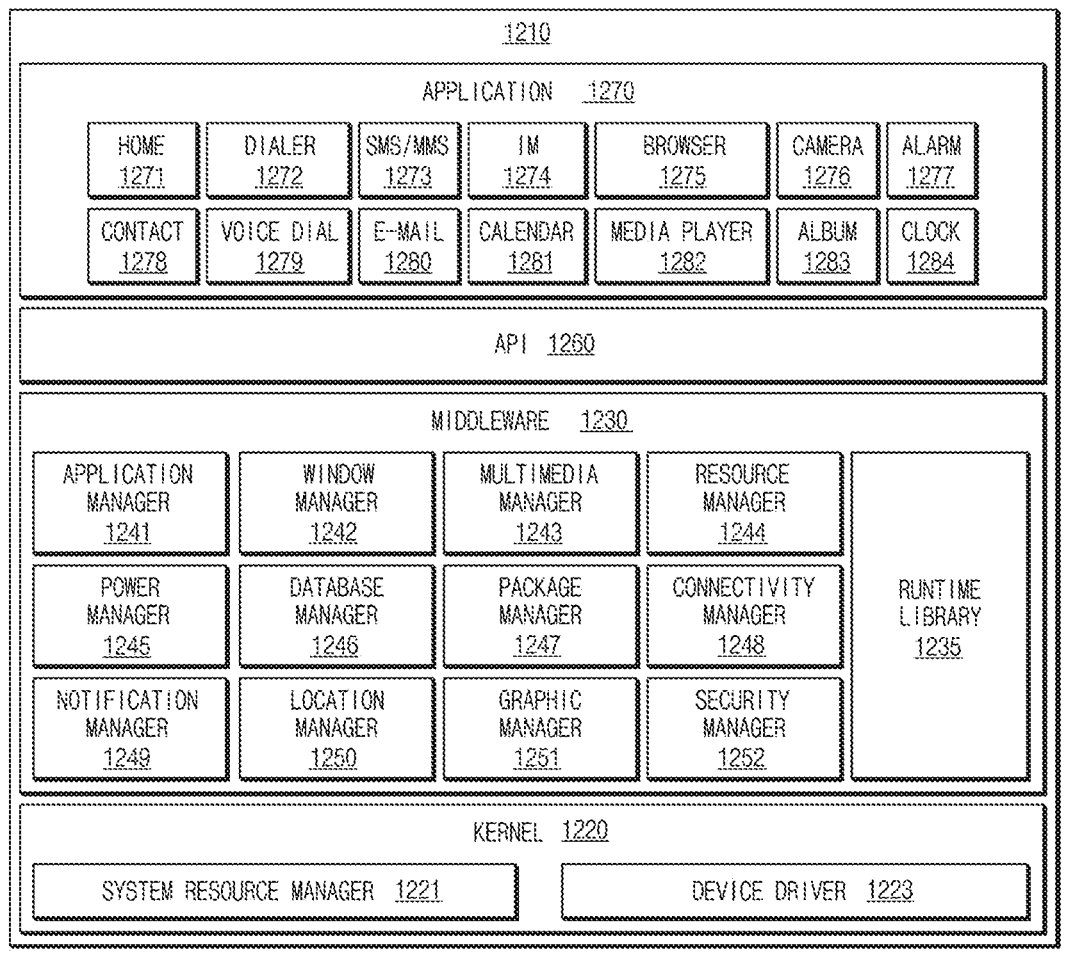
FIG. 12 is a block diagram illustrating a program module according to an embodiment of the present disclosure.

FIG. 12 is a block diagram illustrating a program module according to an embodiment of the present disclosure.

Referring to FIG. 12, a program module 1210 (e.g., the program 1040) may include an operating system (OS) for controlling a resource related to an electronic device (e.g., the electronic device 1001) and/or various applications (e.g., the application program 1047) running on the OS. The operating system may be, for example, Android, iOS, Windows, Symbian, Tizen, or the like.

The program module 1210 may include a kernel 1220, a middleware 1230, an API 1260, and/or an application 1270. At least a part of the program module 1210 may be preloaded on an electronic device or may be downloaded from an external electronic device (e.g., the first electronic device 1002, the second external electronic device 1004, or the server 1006).

The kernel 1220 (e.g., the kernel 1041) may include, for example, a system resource manager 1221 or a device driver 1223. The system resource manager 1221 may perform control, allocation, or retrieval of a system resource. According to an embodiment of the present disclosure, the system resource manager 1221 may include a process management unit, a memory management unit, a file system management unit, or the like. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230, for example, may provide a function that the applications 1270 require in common, or may provide various functions to the applications 1270 through the API 1260 so that the applications 1270 may efficiently use limited system resources in the electronic device. According to an embodiment of the present disclosure, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235 may include, for example, a library module that a complier uses to add a new function through a programming language while the application 1270 is running. The runtime library 1235 may perform a function for input/output management, memory management, or an arithmetic function.

The application manager 1241 may mange, for example, a life cycle of at least one of the applications 1270. The window manager 1242 may manage a GUI resource used in a screen. The multimedia manager 1243 may recognize a format required for playing various media files and may encode or decode a media file using a codec matched to the format. The resource manager 1244 may manage a resource such as a source code, a memory, or a storage space of at least one of the applications 1270.

The power manager 1245, for example, may operate together with a basic input/output system (BIOS) to manage a battery or power and may provide power information required for operating the electronic device. The database manager 1246 may generate, search, or modify a database to be used in at least one of the applications 1270. The package manager 1247 may manage installation or update of an application distributed in a package file format.

The connectivity manger 1248 may manage wireless connection of Wi-Fi, Bluetooth, or the like. The notification manager 1249 may display or notify an event such as message arrival, appointments, and proximity alerts in such a manner as not to disturb a user. The location manager 1250 may manage location information of the electronic device. The graphic manager 1251 may manage a graphic effect to be provided to a user or a user interface related thereto. The security manager 1252 may provide various security functions required for system security or user authentication. According to an embodiment of the present disclosure, in the case in which an electronic device (e.g., the electronic device 1001) includes a phone function, the middleware 1230 may further include a telephony manager for managing a voice or video call function of the electronic device.

The middleware 1230 may include a middleware module for forming a combination of various functions of the above-mentioned elements. The middleware 1230 may provide a module specialized for each type of an operating system to provide differentiated functions. Furthermore, the middleware 1230 may delete a part of existing elements or may add new elements dynamically.

The API 1260 (e.g., the API 1045) which is, for example, a set of API programming functions may be provided in different configurations according to an operating system. For example, in the case of Android or iOS, one API set may be provided for each platform, and, in the case of Tizen, at least two API sets may be provided for each platform.

The application 1270 (e.g., the application program 1047), for example, may include at least one application capable of performing functions such as a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, a clock 1284, health care (e.g., measure an exercise amount or blood sugar), or environmental information provision (e.g., provide air pressure, humidity, or temperature information).

According to an embodiment of the present disclosure, the application 1270 may include an information exchange application for supporting information exchange between the electronic device (e.g., the electronic device 1001) and an external electronic device (e.g., the first electronic device 1002 or the second external electronic device 1004). The information exchange application may include, for example, a notification relay application for relaying specific information to the external electronic device or a device management application for managing the external electronic device.

For example, the notification relay application may have a function for relaying, to an external electronic device (e.g., the first electronic device 1002 or the second external electronic device 1004), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1002 or the second external electronic device 1004) communicating with the electronic device, an application running in the external electronic device, or a service (e.g., a call service, a message service, or the like) provided from the external electronic device.

According to an embodiment of the present disclosure, the application 1270 may include a specified application (e.g., a healthcare application of a mobile medical device) according to an attribute of the external electronic device (e.g., the first electronic device 1002 or the second external electronic device 1004). The application 1270 may include an application received from an external electronic device (e.g., the first electronic device 1002 or the second external electronic device 1004). The application 1270 may include a preloaded application or a third-party application downloadable from a server. The names of the elements of the program module 1210 illustrated may vary with the type of an operating system.

According to various embodiments of the present disclosure, at least a part of the program module 1210 may be implemented with software, firmware, hardware, or a combination thereof. At least a part of the program module 1210, for example, may be implemented (e.g., executed) by a processor (e.g., the processor 1110). At least a part of the program module 1210 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1020), the processor may perform functions corresponding to the instructions. The computer-readable storage medium may be, for example, the memory 1030.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. An electronic device comprising:
a processor;
a communication module to establish a wireless link with an output device; and
a transmit buffer to store an audio packet to be transmitted to the output device through the wireless link,
wherein the processor is configured to:
control the communication module to transmit an audio packet, which is encoded at a first bit rate, stored in the transmit buffer to the output device;
store, in the transmit buffer, an audio packet, which is encoded at a second bit rate lower than the first bit rate, when a state of the transmit buffer fails to satisfy a first threshold condition and a state of a signal strength fails to satisfy a second threshold condition; and
control the communication module to transmit the audio packet encoded at the second bit rate to the output device.

2. The electronic device of claim 1, wherein the communication module is configured to establish a Bluetooth link between the electronic device and the processor.

3. The electronic device of claim 1, wherein the transmit buffer is mounted inside the communication module.

4. The electronic device of claim 1, wherein the audio packet encoded at the first bit rate corresponds to a first packet type, and
wherein the processor is configured to form the audio packet, which is encoded at the second bit rate, in a second packet type.

5. The electronic device of claim 1, wherein the processor is configured to:
decrease a transmit buffer window by one in response to that one audio packet is stored in the transmit buffer; and increase the transmit buffer window by N in response to that the communication module transmits N audio packets, which are stored in the transmit buffer, to the output device.

6. The electronic device of claim 5, wherein the processor is configured to:
store the audio packet, which is encoded at the second bit rate, in the transmit buffer, when a size of the transmit buffer window is less than a specified value.

7. The electronic device of claim 6, wherein the processor is configured to:
store the audio packet, which is encoded at the second bit rate, in the transmit buffer, when an average size of the transmit buffer over a specified time period is less than the specified value.

8. The electronic device of claim 1, wherein the processor is configured to:
store the audio packet, which is encoded at the first bit rate, in the transmit buffer, when the state of the transmit buffer satisfies the first threshold condition and the state of the signal strength satisfies the second threshold condition while the communication module transmits the audio packet encoded at the second bit rate to the output device.

9. The electronic device of claim 8, wherein the processor is configured to:
change a packet type of the audio packet, in response to that a bit rate of the audio packet is changed from the second bit rate to the first bit rate.

10. The electronic device of claim 1, wherein the processor is configured to:
store an audio packet, which is encoded at a third bit rate higher than the second bit rate, in the transmit buffer, when the state of the transmit buffer satisfies the first threshold condition and the state of the signal strength satisfies the second threshold condition while the communication module transmits the audio packet encoded at the second bit rate to the output device.

11. A non-transitory recording medium to store computer-readable instructions, wherein the instructions are configured to, when executed by a processor of an electronic device, cause the processor to perform:
transmitting an audio packet, which is encoded at a first bit rate, stored in a transmit buffer to an output device wirelessly linked to the electronic device;
storing, in the transmit buffer, an audio packet, which is encoded at a second bit rate lower than the first bit rate, when a state of the transmit buffer fails to satisfy a first threshold condition and the state of the signal strength satisfies the second threshold condition; and
transmitting the audio packet, which is encoded at the second bit rate, to the output device.

12. The non-transitory recording medium of claim 11, wherein the audio packet encoded at the first bit rate corresponds to a first packet type, and
wherein the instructions are further configured to cause the processor to perform:
forming the audio packet, which is encoded at the second bit rate, in a second packet type.

13. The non-transitory recording medium of claim 11, wherein the instructions are further configured to cause the processor to perform:
decreasing a transmit buffer window by one in response to that one audio packet is stored in the transmit buffer; and
increasing the transmit buffer window by N in response to transmitting N audio packets, which are stored in the transmit buffer, to the output device.

14. The non-transitory recording medium of claim 13, wherein the instructions are further configured to cause the processor to perform:
storing the audio packet, which is encoded at the second bit rate, to the transmit buffer, when a size of the transmit buffer window is less than a specified value.

15. The non-transitory recording medium of claim 11, wherein the instructions are further configured to cause the processor to perform:
storing an audio packet, which is encoded at a third bit rate higher than the second bit rate, in the transmit buffer, when the state of the transmit buffer satisfies the first threshold condition and the state of the signal strength satisfies the second threshold condition while transmitting the audio packet encoded at the second bit rate to the output device.

* * * * *